Nov. 14, 1933.  H. C. EDWARDS  1,935,180
INTERNAL COMBUSTION ENGINE
Filed May 13, 1932
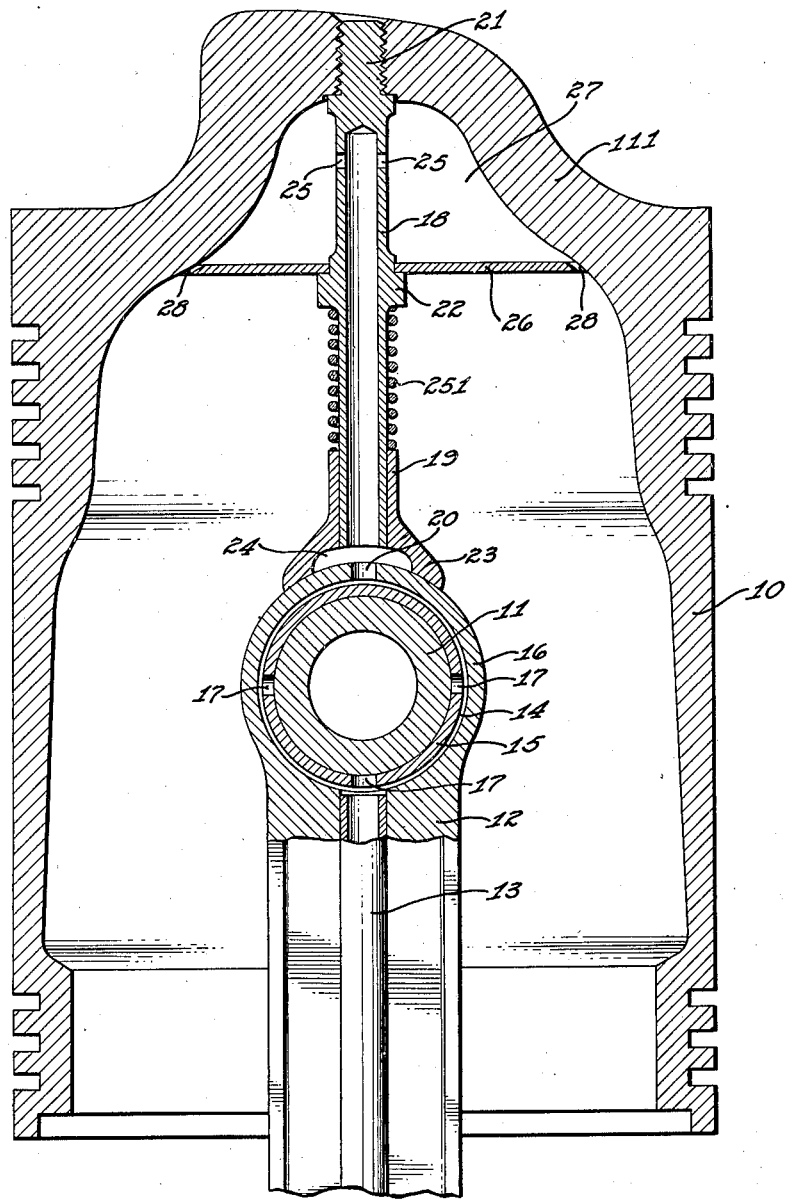
Inventor
HERBERT C. EDWARDS.
By Milton Tibbts
Attorney Patented Nov. 14, 1933

1,935,180

UNITED STATES PATENT OFFICE 1,935,180

INTERNAL COMBUSTION ENGINE

Herbert C. Edwards, Detroit, Mich., assignor to Packard Motor Car Company, Detroit, Mich., a corporation of Michigan Application May 13, 1932. Serial No. 611,140

9 Claims. (Cl. 123—176)

This invention relates to internal combustion engines and more particularly to piston cooling means.

With internal combustion engines developing high pressure, such as Diesel engines, the temperature to which the pistons are subjected is usually very high and particularly when the engine is of the high speed type. Because of this high temperature, carbon collects around the piston rings causing them to become inefficient through sticking or improper functioning, the piston head pits and burns, and the piston distorts and, for various reasons, often sticks in the cylinder.

An object of the invention is to overcome these above mentioned disadvantages through the provision of a new and novel form of piston cooling means.

Another object of the invention is to provide a piston cooling means in which the engine lubricant is utilized to provide a heat transfer medium.

A further object of the invention resides in the provision of means associated with a hollow piston for feeding the cooling fluid to the head thereof and then slowly allowing it to flow away from the head carrying absorbed heat therewith.

Other objects of the invention will appear from the following description taken in connection with the drawing, which forms a part of this specification, and in which the drawing shows a vertical sectional view of a piston having my invention incorporated therewith.

Referring to the drawing, 10 represents a hollow piston body having a head portion 11, such piston being designed for use with a two cycle type of internal combustion engine. Transversing the interior of the hollow piston is the usual wrist pin 11 upon which is rotatably mounted a connecting rod 12.

Associated with the connecting rod is a conduit 13 which connects with a fluid circulating circuit such as a pressure lubricating system of the type shown in an application, Serial No. 326,917 filed December 19, 1928 by Lionel M. Woolson. The outlet end of this conduit 13 is in open communication with a groove 14 formed around the bearing 15 which is pressed into the hollow end of the connecting rod head 16. This groove encircles the bearing and the pin, and ports 17 are arranged to lead the lubricating oil from the groove 14 to the wrist pin on which the bearing of the rod head oscillates.

In order to cool the piston, I provide means whereby oil from the lubricating system leading to the piston wrist pin will be fed continuously against the interior head wall portion of the piston so that it will absorb heat therefrom and drain slowly back into the crank case of the engine through the open end of the hollow piston. To this end, I telescopically associate a pair of members 18 and 19 to provide conduit means leading from an outlet port 20 in the connecting rod, which communicates with the groove 14, to a point adjacent the inner wall of the piston head. The conduit member 18 is provided with a solid threaded end 21 which is arranged to be screwed into the head wall of the piston through the open end of the piston body and such member is provided intermediate its ends with a shoulder portion 22. The other conduit member 19 is formed with an enlarged portion 23 having its bearing end curved to conform to the shape of the connecting rod so as to form a sealing contact thereagainst. This bearing portion 23 and the portion of the rod covered thereby provide a chamber 24 which communicates with the interior of the conduit member 18 and is of sufficient size to remain in open communication with the port 20 in any position of the connecting rod oscillation.

In order to hold the bearing member 23 against the connecting rod, I provide a coil spring 251 which encircles the conduit member 18 and bears at one end against the conduit member 19 and at the other end against the shoulder 22.

During operation of the engine there is a continuous flow of oil through the conduit 13 into the circular groove 14 from which it passes through the ports 17 to lubricate the bearing faces of the pin 11 and the bearing member 15. Oil from the lubricating system is shunted from the circular groove 14 and is forced through the opening 20, the chamber 24 and the interior of the conduit member 18 from which it discharges through ports 25 arranged transversely of the axis of the member. In this manner, oil will be sprayed in continuous streams against the inner wall of the piston head during operation of the engine, and, due to its viscosity and reciprocation of the piston in its cylinder, oil striking the piston head will adhere thereto and will slowly flow away from the piston head through the open end of the piston body. Thus the oil will be moved into intimate thermal contact with the piston head wall, will absorb heat therefrom and will transfer such absorbed heat into the lubricating system upon leaving the hollow piston.

In the event that a larger quantity of oil is desired adjacent the head of the piston than would remain there through the cooling system previously described, I provide a wall 26 which is arranged to traverse the hollow body portion of the piston in spaced relation from the head wall, thus forming a chamber 27 into which oil discharging through the outlet ports 25 will be collected. Such wall is provided with a plurality of outlet openings 28 formed around its edges whereby the oil from the chamber 27 will drain into the open end of the piston body and then back into the crank case. This wall is not essential to the success of the invention but I have found that it provides for a larger body of oil adjacent the piston head than would otherwise collect and, in some instances, this arrangement is desirable.

The wall 26 is provided with a central opening through which the threaded end of the conduit member 18 is projected prior to being screwed into the piston head wall and through the proper location of the shoulder 22 on the conduit member, the wall 26 can thereby be held tightly against the inner wall of the piston so that the only opening from the chamber 27 will be through the ports 28.

It will thus be seen that I am able to utilize the lubricating system of an engine as a fluid medium for transferring heat from the piston head wall to an extent materially assisting in the efficiency of the piston and engine operation.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In an internal combustion engine, the combination of a hollow piston having a wrist pin therein, a connecting rod encircling the pin and having an outlet opening, an oil groove within the rod communicating with the outlet opening, and conduit means fixed in the piston having one end bearing against the rod and enclosing but communicating with the outlet opening in any position of relative movement, the other end of the conduit means having an outlet adjacent the inner wall of the piston head.

2. In an internal combustion engine, the combination of a hollow piston having a wrist pin therein, a connecting rod encircling the pin and having an outlet opening therethrough, a circulatory lubricating means for the rod bearing in open communication with the outlet opening thereof, a conduit member fixed to the piston having outlet openings adjacent the inner wall of the piston head, a movable conduit member having a bearing portion engaging the connecting rod in a relation to enclose the outlet opening in any position of the rod oscillation and telescoping the fixed conduit member, and spring means associated with the conduit members to maintain the movable conduit member in sealed contact with the connecting rod.

3. In an internal combustion engine, the combination of a hollow piston having a wrist pin therein, a connecting rod encircling the pin and having an outlet opening therethrough, oil feeding means for the rod bearing in open communication with the outlet opening, and conduit means in the piston comprising a member fixed to the head of the piston and having outlet openings adjacent the inner wall of the head, and a movable member telescoping the fixed conduit member and engaging the connecting rod, said movable conduit member having an enlarged end sealing against the connecting rod and providing a chamber communicating with the interior of the fixed conduit member and enclosing the outlet opening in the connecting rod in any position of rod oscillation.

4. In an internal combustion engine, the combination of a hollow piston having a transverse extending wrist pin therein, a connecting rod encircling the pin and having an outlet opening therein, lubricant feeding means associated with the wrist pin and communicating with the rod opening, a shouldered conduit member having one end fixed to the head of the piston, a movable conduit member telescoping the other end of said shouldered conduit member and having an endless bearing face engaging the connecting rod and enclosing the outlet opening therein, and a coil spring surrounding the fixed conduit member, one end of said spring bearing against the shouldered portion of the fixed conduit member and the other end of the spring bearing against the movable conduit member normally exerting pressure thereagainst in a direction toward the connecting rod.

5. In an internal combustion engine, the combination of a hollow piston having a wrist pin therein, a connecting rod encircling the pin and provided with an outlet opening, a circulatory lubricating system leading to the rod bearing and in communication with the outlet opening in the rod, a removable wall transversing the inner head portion of the piston, a shouldered conduit member having a threaded end screwed into the cylinder head, the shouldered portion of said conduit means engaging the removable wall to clamp the same against the inner wall of the piston, said fixed conduit member having outlet ports within the piston space enclosed by the removable wall, a plurality of outlet ducts through the removable wall, and means for connecting the interior of the conduit member with the outlet opening in the connecting rod.

6. In an internal combustion engine, the combination of a hollow piston having a wrist pin therein, a connecting rod encircling the wrist pin and having an outlet opening therethrough, a circulatory lubricating means for the rod bearing in open communication with the outlet opening thereof, a conduit member fixed to the piston having outlet openings adjacent the inner wall of the piston head, a movable conduit member having a bearing portion engaging the connecting rod in relation to enclose the outlet opening in any position of the rod oscillation and telescoping the fixed conduit member, and resilient means associated with the movable conduit member to maintain the bearing portion in engagement with the connecting rod.

7. In an internal combustion engine, the combination of a hollow piston having a dome shaped inner wall, a wrist pin in the piston, a connecting rod encircling the pin and provided with an outlet opening, a circulatory lubricating system leading from the rod bearing and communicating with the outlet opening in the rod, a wall traversing the inner head portion of the piston, a conduit member fixed to the head wall of the piston and having openings adjacent the inner surface thereof, said conduit means having a portion thereof supporting the wall with its edges in close proximity to the dome shaped inner surface of the piston, and means connecting the interior of the conduit member with the outlet opening in the connecting rod.

8. In an internal combustion engine, the combination of a hollow piston having a wrist pin therein, a connecting rod encircling the pin and provided with an outlet opening, a circulatory lubricating system leading to the rod bearing and in communication with the outlet opening in the rod, a removable wall traversing the inner head portion of the piston, a flanged conduit member having a threaded end screwed into the piston head, the shoulder portion of said conduit means engaging the removable wall to secure the same against the inner surface of the piston, said fixed conduit member having outlet ports within the piston space enclosed by the removable wall, a plurality of outlet ducts through the removable wall, means for connecting the interior of the conduit member with the outlet opening in the connecting rod, and spring means engaging the flanged portion of the fixed conduit member and the means for connecting the interior of the conduit member with the outlet opening in the connecting rod to hold the same in leak-proof relation with the rod.

9. In an internal combustion engine, the combination of a hollow piston, a wrist pin in the piston, a connecting rod encircling the pin, a bearing between the pin and the encircling portion of the connecting rod, said bearing having a groove around its periphery enclosed by the connecting rod, means for feeding lubricant into the bearing groove, an outlet in the connecting rod in communication with the groove in the bearing, and conduit means in the piston having an outlet adjacent the inner end wall of the piston and an inlet communicating with the outlet in the connecting rod.

HERBERT C. EDWARDS.